United States Patent
Geraud-Stewart

(10) Patent No.: US 12,167,233 B2
(45) Date of Patent: Dec. 10, 2024

(54) METHODS AND SYSTEMS FOR KEY EXCHANGE AND ENCRYPTION

(71) Applicant: QUALCOMM Incorporated, San Diego, CA (US)

(72) Inventor: Remi Geraud-Stewart, Valence (FR)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 17/842,645

(22) Filed: Jun. 16, 2022

(65) Prior Publication Data

US 2023/0412378 A1 Dec. 21, 2023

(51) Int. Cl.
*H04W 12/03* (2021.01)
*H04L 9/06* (2006.01)
*H04L 9/30* (2006.01)
*H04W 12/04* (2021.01)

(52) U.S. Cl.
CPC .......... *H04W 12/03* (2021.01); *H04L 9/0618* (2013.01); *H04L 9/3066* (2013.01); *H04W 12/04* (2013.01); *H04L 2209/80* (2013.01)

(58) Field of Classification Search
CPC .................................................... H04W 12/03
See application file for complete search history.

(56) References Cited

U.S. PATENT DOCUMENTS

| | | | |
|---|---|---|---|
| 2010/0042838 A1* | 2/2010 | Ho | H04L 9/0844 713/169 |
| 2016/0182469 A1* | 6/2016 | Ahmed | H04L 63/0435 380/270 |
| 2016/0255064 A1 | 9/2016 | Naslund et al. | |
| 2020/0267131 A1* | 8/2020 | Tal | H04L 9/14 |
| 2021/0175995 A1* | 6/2021 | Ju | H04K 3/44 |

OTHER PUBLICATIONS

Partial International Search Report—PCT/US2023/067495—ISA/EPO—Sep. 15, 2023.
International Search Report and Written Opinion—PCT/US2023/067495—ISA/EPO—Nov. 7, 2023.

* cited by examiner

*Primary Examiner* — Bradley W Holder
(74) *Attorney, Agent, or Firm* — Polsinelli

(57) ABSTRACT

Some aspects of the present disclosure include systems and techniques for key exchange and encryption to facilitate secure wireless communication. Certain aspects of the present disclosure are directed towards a method for wireless communication by a first device. The method generally includes determining, at a security system, a first output associated with a first expression having a first value for a variable of the first expression; determining, at the security system, a second value; evaluating, at the security system, a second expression based on the first output and the second value, the second expression being evaluated to determine a second output associated with the first expression with the variable having a third value, the third value being a product of the first value and the second value; and communicating, via a communication interface coupled to the security system, a message based on the second output.

30 Claims, 6 Drawing Sheets

400

Determine, At A Security System, A First Output Associated With A First Expression Having A First Value For A Variable Of The First Expression
402

Determine, At The Security System, A Second Value
404

Evaluate, At The Security System, A Second Expression Based On The First Output And The Second Value, The Second Expression Being Evaluated To Determine A Second Output Associated With The First Expression With The First Variable Having A Third Value, The Third Value Being A Product Of The First Value And The Second Value
406

Communicate, Via A Communication Interface Coupled To The Security System, A Message Based On The Second Output
408

FIG. 4

METHODS AND SYSTEMS FOR KEY EXCHANGE AND ENCRYPTION

FIELD

The present disclosure generally relates to techniques for wireless communication. Some aspects of the present disclosure include systems and techniques for key exchange and encryption to facilitate secure wireless communication.

BACKGROUND

Data communicated on a wireless medium may be subject to security exploits. As a result, various techniques have been developed for the secure wireless exchange of data. Key exchange is a cryptography technique where keys are exchanged between two parties that allow for secure communication between the parties using a cryptographic algorithm. For example, public-key encryption may be used as a method of encrypting data using two keys. One of the keys may be referred to as the public key, which may be available to anyone. The other key is known as the private key (also referred to as a secret key) and is not made public. Data encrypted with the public key may be decrypted with the private key. Moreover, in cryptography, a ciphertext may be generated for wirelessly transmitting a message, the cyphertext referring to the result of encryption performed on plaintext using an algorithm called a cipher. Ciphertext contains a form of plaintext that is unreadable by a human or computer without the proper cipher to decrypt it.

SUMMARY

Certain aspects of the present disclosure are directed towards systems and techniques for key exchange and encryption to facilitate secure wireless communication. According to one example, an apparatus for wireless communication by a first device is provided that includes at least one memory; and one or more processors coupled to the at least one memory and configured to: determine, at a security system, a first output associated with a first expression having a first value for a variable of the first expression; determine, at the security system, a second value; evaluate, at the security system, a second expression based on the first output and the second value, the second expression being evaluated to determine a second output associated with the first expression with the variable having a third value, the third value being a product of the first value and the second value; and communicate, via a communication interface coupled to the security system, a message based on the second output.

In another example, a method for wireless communication by a first device is provided. The method includes: determining, at a security system, a first output associated with a first expression having a first value for a variable of the first expression; determining, at the security system, a second value; evaluating, at the security system, a second expression based on the first output and the second value, the second expression being evaluated to determine a second output associated with the first expression with the variable having a third value, the third value being a product of the first value and the second value; and communicating, via a communication interface coupled to the security system, a message based on the second output.

In another example, a non-transitory computer-readable medium is provided that has stored thereon instructions that, when executed by one or more processors, cause the one or more processors to: determine, at the security system, a first output associated with a first expression having a first value for a variable of the first expression; determine, at the security system, a second value; evaluate, at the security system, a second expression based on the first output and the second value, the second expression being evaluated to determine a second output associated with the first expression with the variable having a third value, the third value being a product of the first value and the second value; and communicate, via a communication interface coupled to the security system, a message based on the second output.

In another example, an apparatus for wireless communication is provided. The apparatus includes: means for determining a first output associated with a first expression having a first value for a variable of the first expression; means for determining a second value; means for evaluating a second expression based on the first output and the second value, the second expression being evaluated to determine a second output associated with the first expression with the variable having a third value, the third value being a product of the first value and the second value; and means for communicating, via a communication interface, a message based on the second output.

According to at least one other example, an apparatus for wireless communication by a first device is provided. The apparatus includes at least one memory and one or more processors coupled to the at least one memory and configured to: obtain a message having multiple bits to be encrypted, wherein each of the multiple bits is associated with a public key value of a plurality of public key values; calculate a product of one or more public key values from the plurality of public key values associated with one or more of the multiple bits, the one or more of the multiple bits being logic high; generate a cyphertext based on the product of the one or more public key values; and transmit, via a communication interface, the cyphertext.

In another example, a method for wireless communication by a first device is provided. The method includes: obtaining a message having multiple bits to be encrypted, wherein each of the multiple bits is associated with a public key value of a plurality of public key values; calculating a product of one or more public key values from the plurality of public key values associated with one or more of the multiple bits, the one or more of the multiple bits being logic high; generating a cyphertext based on the product of the one or more public key values; and transmitting, via a communication interface, the cyphertext.

In another example, a non-transitory computer-readable medium is provided that has stored thereon instructions that, when executed by one or more processors, cause the one or more processors to: obtain a message having multiple bits to be encrypted, wherein each of the multiple bits is associated with a public key value of a plurality of public key values; calculate a product of one or more public key values from the plurality of public key values associated with one or more of the multiple bits, the one or more of the multiple bits being logic high; generate a cyphertext based on the product of the one or more public key values; and transmit, via a communication interface, the cyphertext In another example, an apparatus for wireless communication is provided. The apparatus includes: means for obtaining a message having multiple bits to be encrypted, wherein each of the multiple bits is associated with a public key value of a plurality of public key values; means for calculating a product of one or more public key values from the plurality of public key values associated with one or more of the multiple bits, the one or more of the multiple bits being logic high; means for generating a cyphertext based on the product of the one or more public key values; and means for transmitting the cyphertext In some aspects, one or more of the apparatuses described above is, can be part of, or can include a vehicle or component or system of a vehicle, a mobile device (e.g., a mobile telephone or so-called "smart phone" or other mobile device), an Internet-of-Things (IoT) device, an extended reality (XR) device (e.g., a virtual reality (VR) device, an augmented reality (AR) device, or a mixed reality (MR) device), a wearable device, a personal computer, a laptop computer, a tablet computer, a server computer, a robotics device or system, an aviation system, or other device. In some aspects, one or more of the apparatuses includes an image sensor (e.g., a camera) or multiple image sensors (e.g., multiple cameras) for capturing one or more images. In some aspects, one or more of the apparatuses includes one or more displays for displaying one or more images, notifications, and/or other displayable data. In some aspects, one or more of the apparatuses includes one or more speakers, one or more light-emitting devices, and/or one or more microphones. In some aspects, one or more of the apparatuses described above can include one or more sensors. For instance, the one or more sensors can include at least one of a light-based sensor (e.g., a LIDAR sensor, a radar sensor, etc.), an audio sensor, a motion sensor, a temperature sensor, a humidity sensor, an image sensor, an accelerometer, a gyroscope, a pressure sensor, a touch sensor, and a magnetometer. In some cases, the one or more sensors can be used for determining a location of the apparatuses, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 4 is a flow diagram illustrating an example process for wireless communication, in accordance with certain aspects of the present disclosure.

DETAILED DESCRIPTION

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As described herein, data communicated on a wireless medium may be subject to security exploits. Key exchange and encryption are example cryptography techniques that may be used to secure data for communication. The strength of the cryptography technique used is important to ensure the secure exchange of data across networks. For example, due to a security exploit, valuable data may be stolen from individuals by a third party. Therefore, systems and techniques are needed for key exchange and encryption that provide strong security for data communication.

Systems, apparatuses, processes (also referred to as methods), and computer-readable media (collectively referred to herein as "systems and techniques") are described herein for key exchange and encryption. Certain aspects provide an algorithm that facilitates the secure exchange of messages between two devices. The algorithm allows a first device to receive a first value from a second device and select a secret value. The first device may also generate a second value for transmission to the second device based on the secret value using the algorithm. Based on the received first value and the secret value, the first device may determine a cryptographic session key which may only be known by the first and second devices. The algorithm may also be used to decrypt an encrypted message, as described in more detail herein. The systems and techniques provide a new algorithm for key exchange and/or encryption. As described in more detail herein, a key exchange algorithm according to such systems and techniques does not require factorization to be known. For example, numbers with factorizations that are unknown, but that are known to be composite, can be used as a factorization n. Further details and advantages are described herein.

Figure 1:
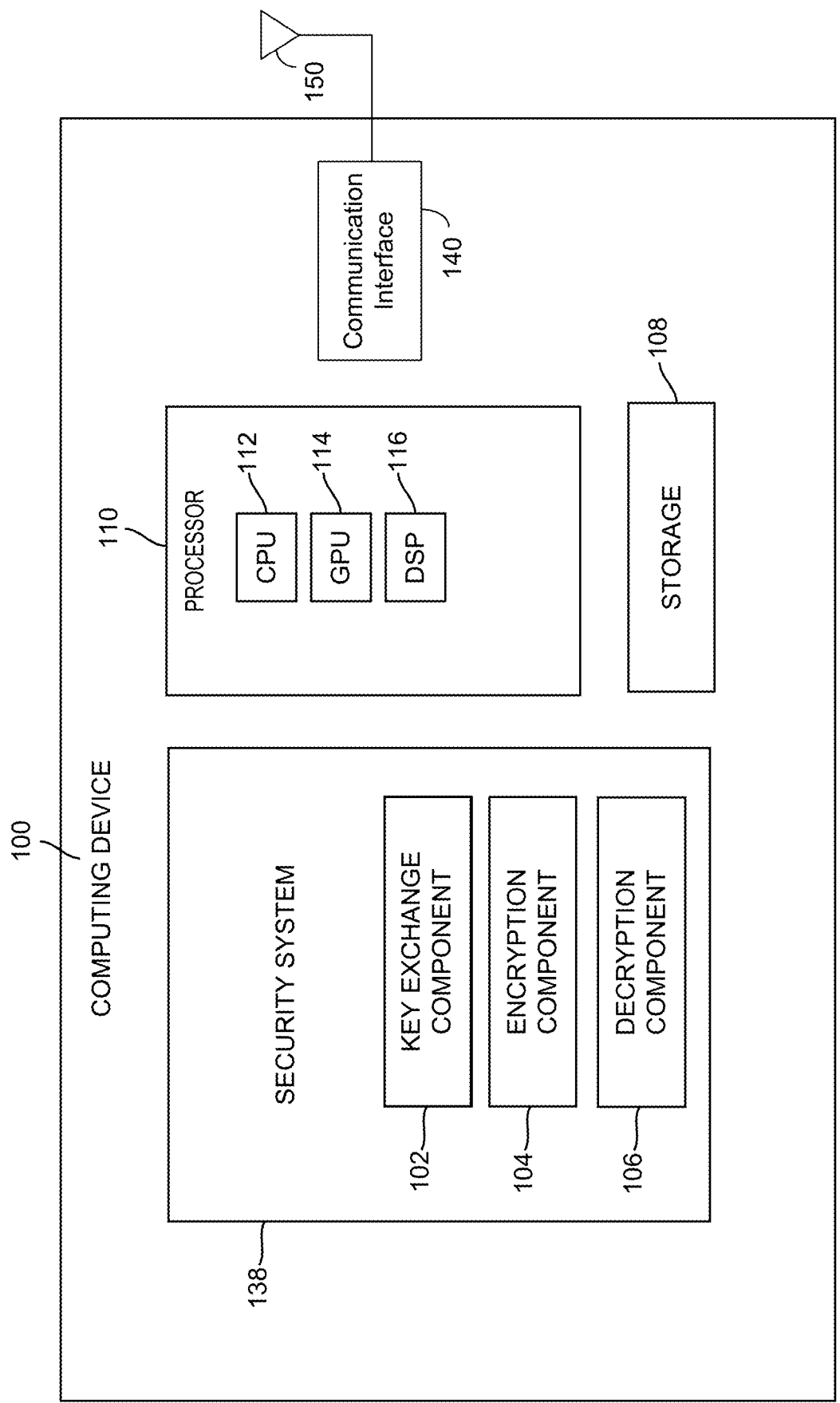
FIG. 1 is a diagram illustrating an example computing device, in accordance with some examples.

FIG. 1 is a diagram illustrating an example computing device 100, in accordance with some examples. In the example shown, the computing device 100 may include storage 108, processor 110, and memory controller 112. Storage 108 can include any storage device(s) for storing data. The storage 108 can store data from any of the components of the computing device 100. In some implementations, the processor 110 can include a central processing unit (CPU) 112, a graphics processing unit (GPU) 114, and/or a digital signal processor (DSP) 116. In some aspects, the computing device 100 includes a security system 138. The security system may be any system, device, or one or more components of a system or device configured to provide cryptographic security. The security system 138 may be implemented as part of the processor 110, storage 108, and/or communication interface 140 in some aspects. The security system 138 may include a key exchange component 102, an encryption component 104, and a decryption component 106, which may be implemented in hardware, software, or a combination of hardware and software. In some aspects, the computing device 100 may include a communication interface 140 which may transmit or receive signals via at least one antenna 150.

Certain aspects provide an algorithm (e.g., represented by function E(g, k)) for facilitating a key exchange process and a public-key encryption process. The key exchange process described herein may be performed by the key exchange component 102 and/or the processor 110. In some examples, the algorithm may be represented by a function E(g, k). The algorithm may be provided with two inputs, including a value $g_a$ and a value b, where $g_a$ is a function represented by equation:

$$g_a = r^a + r^{-a} \bmod n$$

where n and r are any integers. The algorithm may be provided the two inputs $g_a$ and b, and provides as output a value $g_{ab}$, where $g_{ab}$ is equal to:

$$g_{ab} = r^{ab} + r^{-ba} \bmod n$$

The output of the algorithm (e.g., output of function E(g, k)) may be used to implement a key exchange process and/or public-key encryption process. For the key exchange process, the values of a and b may be used as private keys and $g_a$ and $g_b$ may be used as public keys. The security of the key exchange is facilitated by the difficulty to extract the value of variable a merely by knowing the public key $g_a$. The function E(g, k) may be defined as the second coordinate of the vector:

$$M(g, k) \cdot \binom{g}{2} \bmod n$$

where M(g, k) is a helper recursive function and · is a dot product. The helper recursive function M(g, k) may be implemented as an algorithm, including various operations. In one illustrative operation, M(g, k) returns a 2×2 identity matrix ($I_2$) if k is equal to 0. For instance, the operation of the algorithm may include the following:

If k==0 return $I_2$. (2×2 identity matrix)

In one illustrative example, if k is equal to 0, the equation for $g_a$ (e.g., $r^0 + r^{-0} \bmod n$) is equal to 2. Thus, when k is equal to 0, M(g, k) may be set to be equal to the identity matrix ($I_2$) in order for E(g, k) to be equal to 2. Another operation of the algorithm may include:

Let $m_1 \leftarrow \begin{pmatrix} g & -1 \\ 1 & 0 \end{pmatrix}$.

If $k == 1$ return $m_1$

That is, when k is equal to 1, then M(g, k) may be set to be equal to $m_1$ which may be set as:

$$\begin{pmatrix} g & -1 \\ 1 & 0 \end{pmatrix}$$

such that E(g, k) is equal to $g_1$ (e.g., $g_a$ with a equal to 1). Other operations of the algorithm may include:

Let $m_2 \leftarrow M(g, \lfloor k/2 \rfloor)^2$ mod n (floored division by 2)

If k is even return $m_2$

Otherwise return $m_1 m_2$ mod n (standard matrix multiplication)

That is, if k is even, M(g, k) may return $m_2$ which may be set to:

$M(g, \lfloor k/2 \rfloor)^2$ mod n which includes a floored division by 2. Otherwise (e.g., if k is odd), a standard matrix multiplication may be performed in accordance with expression:

$m_1 m_2$ mod n

A key property of the algorithm is that it satisfies the following equality for all a, b, and r:

$$E(g_a, b) = g_{ab}$$

The algorithm terminates in time O(log k) due to the expression $M(g, \lfloor k/2 \rfloor)^2$ mod n terminating after log k attempts, and uses O(1) memory since the only value that may be stored is the current value of the computation associated with the algorithm.

Figure 2:
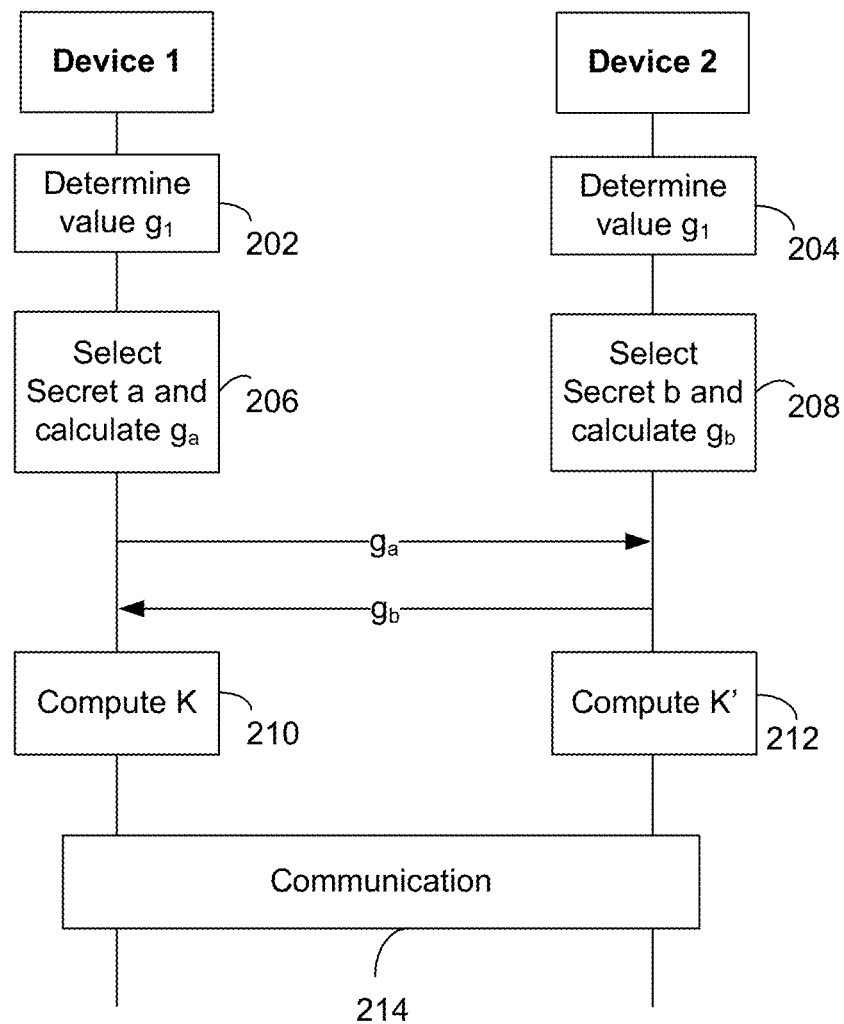
FIG. 2 illustrates a key exchange process between users, in accordance with certain aspects of the present disclosure.

FIG. 2 illustrates an illustrative example of the key exchange process between users, in accordance with certain aspects of the present disclosure. Device 1 and device 2 may agree on a value $g_1$. For example, at block 202, device 1 determines the value $g_1$ and at block 204, device 2 determines the value $g_1$. For example, value $g_1$ may be calculated as:

$$g_1 = r^1 + r^{-1} \bmod n$$

The value of $g_1$ may be preconfigured or indicated to each device.

At block 206, user 1 may select a secret (e.g., private) value a, and at block 208, user 2 may select a secret (e.g., private) value b. User 1 may then compute $g_a = E(g_1, a)$ and user 2 may compute $g_b = E(g_1, b)$, as described herein. That is, user 1 may calculate the function $E(g_1, k)$ as described, where k is equal to a, and user 2 may calculate the function $E(g_1, k)$ as described, where k is equal to b. User 1 may transmit $g_a$ to user 2 and user 2 may transmit $g_b$ to user 1, as shown. Once user 1 receives $g_a$, user 1 computes at block 210, using the algorithm described herein (e.g., E(g, k)), K as:

$$K = E(g_b, a) = g_{ba}$$

Similarly, using the algorithm described herein, user 2 computes, at block 212, K' as:

$$K' = E(g_a, b) = g_{ab}$$

Given that $g_{ab}$ and $g_{ba}$ are equal, the exchanged keys (e.g., $g_a$ and $g_b$) can be used to facilitate the calculation of the same value (e.g., K at device 1 and K' at device 2), which may then be further processed and used to encrypt a message for communication 214 between device 1 and device 2. That is, K=K' is now a shared secret between device 1 and device 2, which may be used to derive a cryptographic session key. To increase security, an integer n (e.g., for calculating $g_a$ and $g_b$) may be selected that is hard to factor (e.g., so that a hacker cannot calculate or cannot easily calculate the secret value a by intercepting the value $g_a$).

Figure 3:
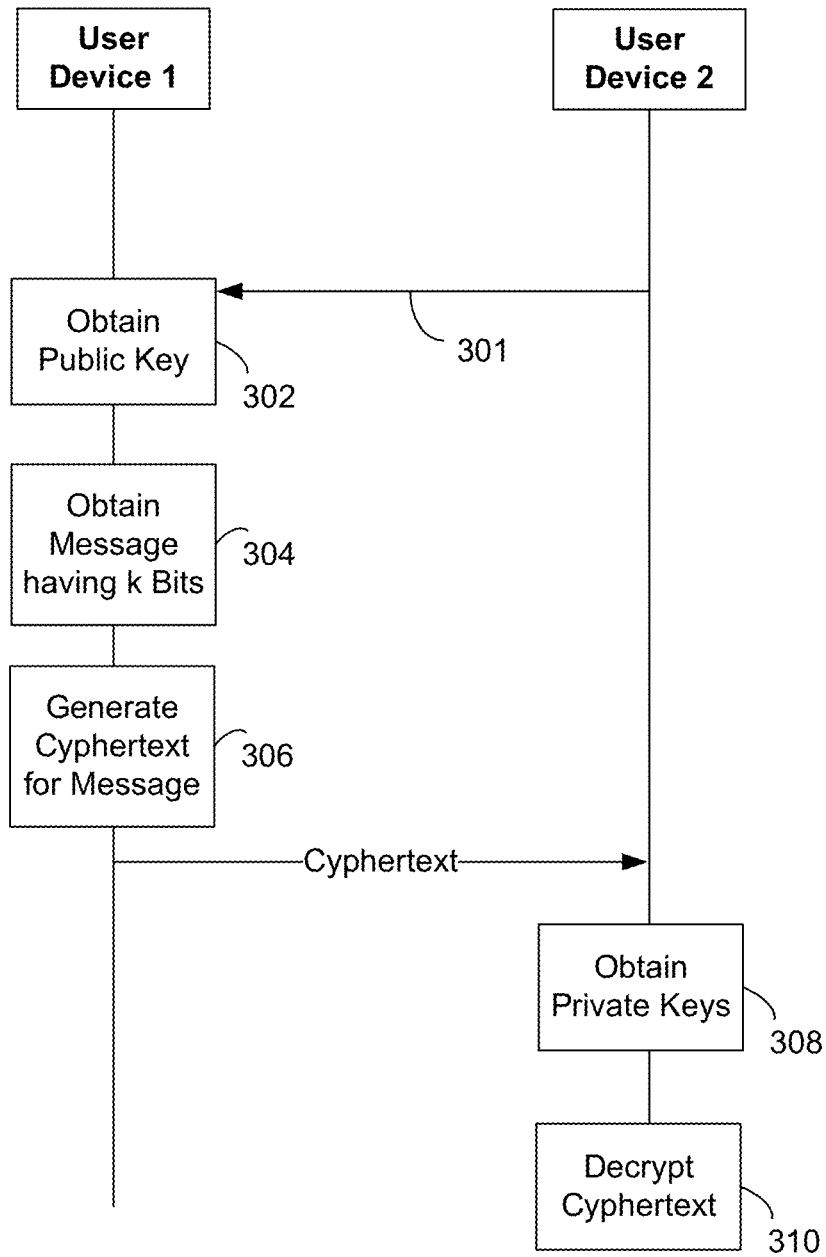
FIG. 3 illustrates a public-key encryption and decryption process, in accordance with certain aspects of the present disclosure.

FIG. 3 illustrates a public-key encryption and decryption process that may be implemented using the algorithm described herein (e.g., E(g, k)), in accordance with certain aspects of the present disclosure. Public-key cryptography is a process that uses a public key and a private key to encrypt and decrypt a message. The public key may be used to encrypt a message so that it can only be decrypted by the decryptor using a private key. For example, at block 302, device 1 may obtain a public key and at block 304, obtain a message to be encrypted. At block 306, device 1 may encrypt the message to generate a cyphertext (c) using the public key. The public key may be advertised (e.g., broadcasted) by the device 2, and obtained by device 1 for encryption of the message. For example, at 301, device 2 may broadcast the public key, and device 1 may receive the public key.

The cyphertext may be generated using the following techniques. For the k first prime integers $p_1=2, p_2, \ldots, p_k$ and n is larger than the product of the prime integer's cubes, device 1 can make a selection S of u secret primes, where s denotes the product of the u secret primes. Moreover, it may be assumed that $gcd(\emptyset(n), s)=1$, where gcd is the greatest common divisor. The gcd is equal to one so that the negative s-th power may be computed (e.g., since otherwise, s is not invertible modulo phi of n). Let $y_i = p_i^{-s}$ mod n.

To encrypt a k-bit message $\vec{m} = \{m_0, \ldots, m_k\}$, device 1 may first compute V as the product of all $y_i$ where the index i is such that $m_i=1$, and where:

$$y_i = p_i^{-s} \bmod n$$

The ciphertext (c) may be set to:

$$c = V + V^{-1} \bmod n$$

The public key may be n, k, $\vec{y}$ and the private key may be S together with the factorization of n.

As one example, to encrypt a message having four bits, then k is equal to 4. Moreover, the k first prime integers are $p_1=2, p_2=3, p_3=5, p_4=7$. Device 1 may select n as any integer larger than the cube of the prime numbers. For example, n may be selected as being larger than $2^3 \times 3^3 \times 5^3 \times 7^3$. A number u of secret primes may be selected. For example, prime numbers 2 and 3 may be chosen, which may define the selection S. Then s may be equal to the product of 2 and 3 (e.g., 6). $y_i$ may be as follows:

$$y_1 = 2^{-6} \bmod n; y_2 = 3^{-6} \bmod n; y_3 = 5^{-6} \bmod n; y_4 = 7^{-6} \bmod n$$

The public key may be n, k, and values of y above. The private key may be S together with the factorization of n. To encrypt the four bits of the message, where the four bits are 1011, all the $y_i$ numbers corresponding to the bits that are logic high may be multiplied. For example, for bits 1011, V may be calculated as:

$$V = y_1 \times y_3 \times y_4$$

The calculated value V may be used to generate the cyphertext c, as described. The cyphertext is then transmitted to the device 2.

At block 308, device 2 obtains a private key, and at block 310, decrypts the cyphertext (c). To decrypt c, the device 2 first computes $c' = E(c, s_1)$, then $c'' = E(c', s_2)$, etc. For example, the value c may be inserted into the algorithm E, providing a result c' which is then again input to the algorithm E to obtain c'', and so on. This process may be repeated for all the primes of S (or less than all primes of S in some cases). This process may be described as the right fold operation folder(c,S,E). The final result of this operation is $$\Pi p_i + \Pi p_i^{-1} \bmod n$$

where the products run over the indices i such that $m_i=1$. For instance, for a message with the bits 1011, the final result may be equal to $(2 \times 5 \times 7) + (2 \times 5 \times 7)^{-1}$ mod n. This is a particular instance of the problem of computing a given ($g_1$, $g_a$), which is as hard as factoring n (e.g., involves the same or a greater amount of computations as factoring n), but since the factorization of n is known to the decryptor, the decryptor can solve the problem. The decryptor recovers $P = \Pi m_{i=1} p_i$ mod $n = \Pi m_{i=1} p_i$ (e.g., because of the size constraint on n, the product does not wrap around for modulo function). The bits of message m are then recovered by determining which factors $p_i$ appear in P, namely:

$$m_1 = \begin{cases} 1 & \text{if } gcd(p_i, P) > 1 \\ 0 & \text{otherwise} \end{cases}$$

With regard to security, there is the problem of computing $g_{ab}$ given ($g_1, g_a, g_b$), or computing a given ($g_1, g_a$). These problems are similar to discrete logarithm problems. Note that r does not explicitly appear in either problem. For well-chosen values of r and n, these problems are as hard as factoring n, and thus provide strong encryption security. For example, when solving general quadratic equations, computing modulo n is similar to, from a computation difficulty perspective, factoring n. One can solve the equation modulo for each prime factor of n and recombine solutions using the Chinese remainder theorem. Solving $g_1$ for r is such an equation, and more generally solving $g_a$ for $r^a$. Recovering a is the discrete logarithm problem modulo n, which is again as hard as factoring in general.

The security associated with computing $g_{ab}$ given ($g_1, g_a, g_b$) is conjectural. One example of a generic attack that can be used against this problem may be to solve the problem of computing a given ($g_1, g_a$). To improve security, n may be set to a product of two large safe primes (e.g., n=pq with p and q such that (p−1)/2 and (q−1)/2 are prime, and p, q are above 1024 bits) and for r the value achieving the longest cycle.

Moreover, the values $g_a$ for varying a may be set to not form an Abelian group. As such, computing the "inverse" is neither guaranteed to be possible, nor easy (e.g., a device may check that $g_{-a} = g_a$ and that $g_a g_b \neq g_{a+b}$). Standard multiplication may be difficult to use for the E operation (e.g., a device may check that $E(x_{ga}, b) \neq E(x, b) g_{ab}$). This has several consequences, both for the attacker (e.g., which cannot rely on well-known group-theoretic techniques for attack) and for the designer (which cannot rely on well-known group-theoretic constructions).

The security of encryption and key exchange techniques described herein rely on the hardness of integer factoring. Even if factoring n is within reach of an attacker, there may be no obvious way to break the public-key encryption scheme described. The key exchange algorithm does not require the factorization to be known, so numbers whose factorizations are unknown, but that are known to be composite, can be used as n. One example is large Mersenne numbers that are not Mersenne primes. Such numbers furthermore make modular reduction efficient. The implementation of these algorithms may involve a small amount of operations (e.g., linear algebra operations), which can reduce computational complexity. The absence of a group structure makes usual attack techniques less relevant against the scheme. The key exchange scheme provides forward secrecy.

In some aspects, the algorithm described herein may be implemented using integers β (e.g., a "tweak" β) and ℓ (e.g., a "level" ℓ). For example, consider the equation:

$$g_a^{(\ell)} = r^a + \beta^\ell r^{-a}$$

When β is equal to 0, the equation yields back a typical exponentiation. The level ℓ does not matter because β=0 for all ℓ. When β is set to 1, the level ℓ does not matter because $\beta^\ell = 1$ for all ℓ. Otherwise, in general, the following equation holds:

$$g_a^{(\ell)} g_b^{(\ell')} = g_{a+b}^{(\ell+\ell')} + \beta^{\ell'} g_{a-b}^{(\ell-\ell')}$$

The case where β=1 is particularly simple, and in this case, the level ℓ can be either 0 or 1. This gives identities such as:

$$-g_a^{(\ell)} = (-1)^\ell g_a^{(\ell)}$$

$$g_{2a}^{(0)} = \left[g_a^{(\ell)}\right]^2 - \beta^\ell g_0^{(0)}$$

$$g_{a+b}^{(\ell)} = g_a^{(\ell)} g_b^{(0)} - g_{a-b}^{(\ell)}$$

Together, these identities suggest there might exist a Montgomery-ladder-style algorithm for computing $g_k^{(0)}$ (and perhaps $g_k^{(\ell)}$) efficiently. The key exchange and encryption algorithms for β=1 may be used with β=−1 as well due to the leveling, using β=−1 essentially doubles the output domain. Using n as a product of safe primes means that there is no other small order β known to an attacker. There are nontrivial square roots of −1 and 1, but knowing them is equivalent to factoring n, and thus, may not be transmitted. It is conceptually possible to implement the constructions discussed here over any commutative ring. Not all such rings are suitable from a security standpoint. Examples of rings that are not insecure include (quotients of) multivariate polynomial rings over finite fields and matrix rings.

FIG. 4 is a flow diagram illustrating an example process 400 for wireless communication, in accordance with certain aspects of the present disclosure. The operations of process 400 may be performed by a first device, such as the computing device 100 of FIG. 1.

At block 402, the computing system determines a first output (e.g., $g_a$ received by device 2 from device 1 as shown in FIG. 2) associated with a first expression having a first value for a variable (e.g., a as described with respect to FIG. 2) of the first expression. In some aspects, the first expression includes:

$$r^a + r^{-a} \mod n$$

where a is the variable of the first expression, r is a positive integer, and n is a positive integer. In some aspects, the computing system receives, from a second device, an indication of the first output (e.g., device 2 receives $g_a$ from device 1 as described with respect to FIG. 2).

At block 404, the computing device determines a second value (e.g., b as selected by computing device 2 shown in FIG. 2).

At block 406, the computing device evaluates a second expression (e.g., E function) based on the first output and the second value, the second expression being evaluated to determine a second output (e.g., $g_{ab}$) associated with the first expression with the first variable having a third value (e.g., product of a and b), the third value being a product of the first value (e.g., a) and the second value (e.g., b).

In some aspects, the computing device may determine (e.g., at key exchange component 102) a third output value (e.g., $g_b$), the third output value being associated with the first expression having the second value (e.g., b as shown in FIG. 2) for the variable of the first expression. The computing device may transmit an indication of the third output value to the second device.

In some aspects, the second expression is evaluated in accordance with one or more rules for determining an output of a helper recursive function (e.g., function M described herein) of the second expression. The one or more rules may include setting the output of the helper recursive function to an identity matrix if the second value is 0. In some aspects, the one or more rules may include setting, if the second value is 1, the output of the helper recursive function to:

$$\begin{pmatrix} g & -1 \\ 1 & 0 \end{pmatrix}$$

where g represents the first output.

In some aspects, the one or more rules may include setting, if the second value is even, the output of the helper recursive function to:

$$M(g, \lfloor k/2 \rfloor)^2 \mod n$$

where M represents the helper recursive function, g represents the first output value, k represents the second value, and n is a positive integer. In some aspects, the one or more rules include setting, if the second value is odd and greater than 1, the output of the helper recursive function to:

$$m_1 m_2 \mod n$$

where n is a positive integer, and where $m_1$ is:

$$\begin{pmatrix} g & -1 \\ 1 & 0 \end{pmatrix}$$

where g represents the first output value, and where $m_2$ is:

$$M(g, \lfloor k/2 \rfloor)^2 \mod n$$

where M represents the helper recursive function, k represents the second value, and n is a positive integer.

At block 408, the computing device communicates a message with a device based on the second output. For example, the second output may be a cryptography session key for communicating the message.

In some aspects, the first output (e.g., where the first output is a cyphertext c) is received from the second device, the first output being a cyphertext associated with the message. The second value may include a first prime number (e.g., $s_1$). In this case, the second output is referred to herein as c'. The computing device may evaluate the second expression (e.g., E(c', $s_2$)) based on the second output and a second prime number to determine a third output (e.g., c'). The computing device then decrypts (e.g., via decryption component 106) the message based on the third output value. The first prime number and the second prime number may be private keys for decrypting the message.

In some aspects, the computing device may select a subset of prime numbers (e.g., selection S of u secret primes as described with respect to FIG. 3). For each of the prime numbers, the computing device may calculate a public key value (e.g., $y_i$ as described with respect to FIG. 3) based on a product (e.g., s as described with respect to FIG. 3) of the subset of the prime numbers, and transmit the public key values to the second device. For example, to calculate the public key value, the computing device may calculate the public key value based on expression:

$$p_i^{-s} \bmod n$$

where $p_i$ is the corresponding prime number, s is the product of the subset of prime numbers, and n is a positive integer.

Figure 5:
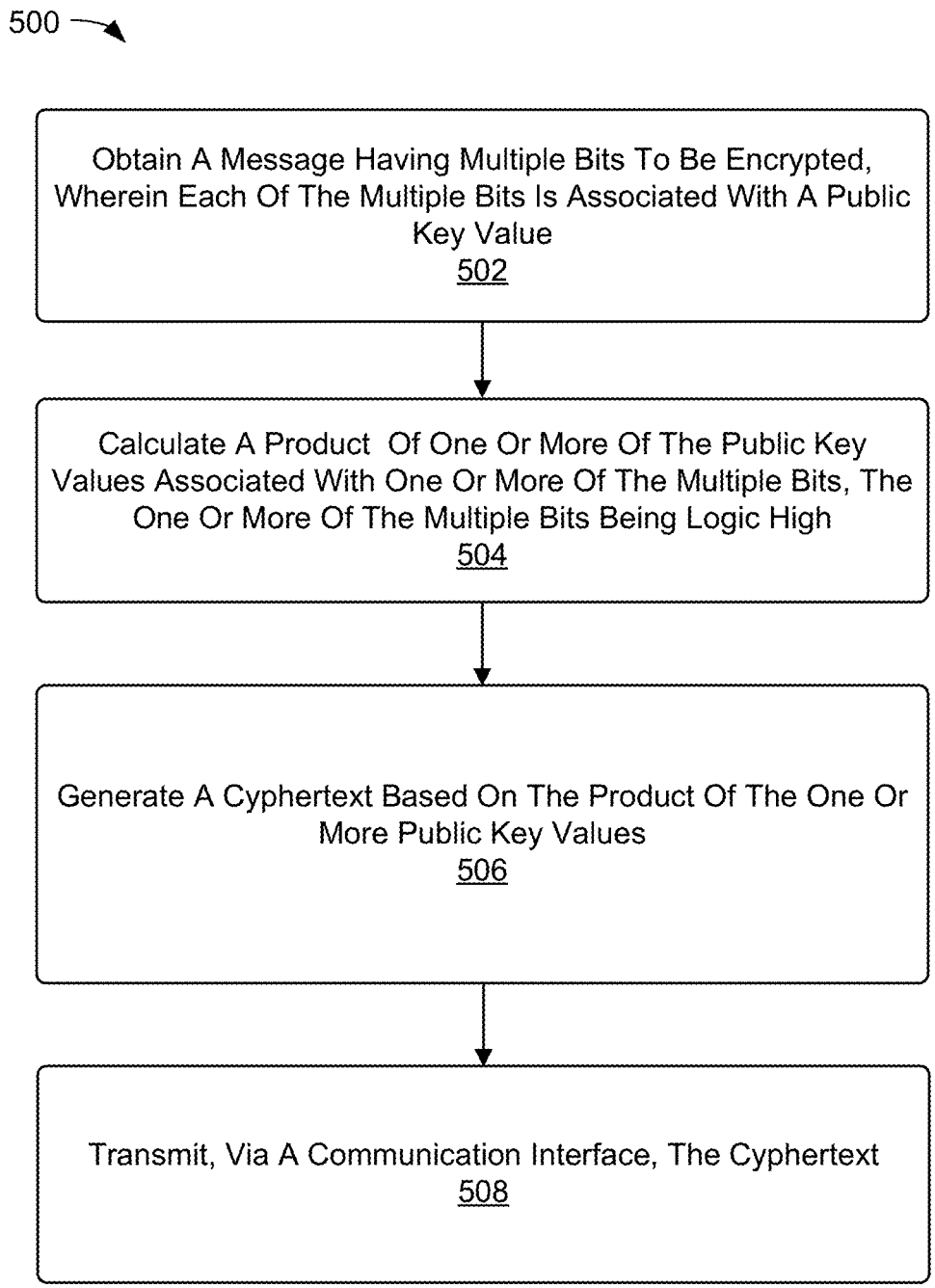
FIG. 5 is a flow diagram illustrating an example process for wireless communication using encryption, in accordance with certain aspects of the present disclosure.

FIG. 5 is a flow diagram illustrating an example process 500 for wireless communication, in accordance with certain aspects of the present disclosure. The operations of process 500 may be performed by a first device, such as the computing device 100 of FIG. 1.

At block 502, the computing device may determine a message having multiple bits (e.g., k bits) to be encrypted. Each of the multiple bits may be associated with a public key value (e.g., $y_i$ as described with respect to FIG. 3). In some cases, the public key value may be received from a receiver device.

At block 504, the computing device may calculate a product (e.g., V as described with respect to FIG. 3) of one or more of the public key values associated with one or more of the multiple bits, the one or more of the multiple bits being logic high.

At block 506, the computing device generates (e.g., via encryption component 104) a cyphertext based on the product of the one or more public key values, and at block 508, transmits the cyphertext to the receiver device. For example, the computing device may generate the cyphertext based on equation:

$$V+V^{-1} \bmod n$$

where V is the product of the one or more public key values, and n is a positive integer.

Figure 6:
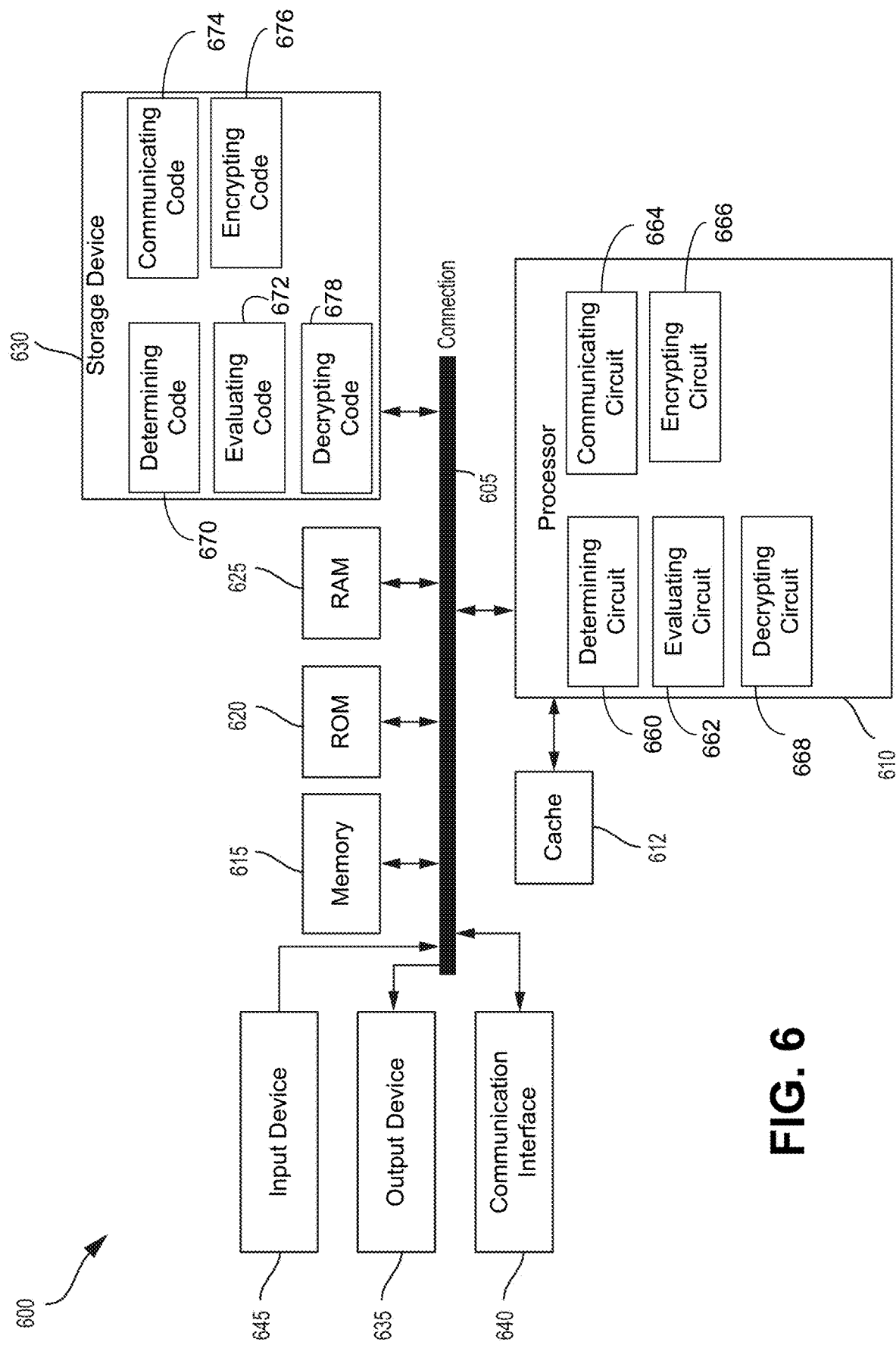
FIG. 6 is a diagram illustrating an example of a system for implementing certain aspects of the present technology.

FIG. 6 is a diagram illustrating an example of a system for implementing certain aspects of the present technology. In particular, FIG. 6 illustrates an example of computing system 600, which can be for example any computing device making up internal computing system, a remote computing system, a camera, or any component thereof in which the components of the system are in communication with each other using connection 605. Connection 605 can be a physical connection using a bus, or a direct connection into processor 610, such as in a chipset architecture. Connection 605 can also be a virtual connection, networked connection, or logical connection.

In some aspects, computing system 600 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 600 includes at least one processing unit (CPU or processor) 610 and connection 605 that couples various system components including system memory 615, such as read-only memory (ROM) 620 and random-access memory (RAM) 625 to processor 610. Computing system 600 can include a cache 612 of high-speed memory connected directly with, in close proximity to, or integrated as part of processor 610.

Processor 610 can include any general purpose processor and a hardware service or software service. In some aspects, code stored in storage device 630 may be configured to control processor 610 to perform operations described herein. In some aspects, the processor 610 may be a special-purpose processor where instructions or circuitry are incorporated into the actual processor design to perform the operations described herein. Processor 610 may essentially be a completely self-contained computing system, containing multiple cores or processors, a bus, memory controller, cache, etc. A multi-core processor may be symmetric or asymmetric. The processor 610 may include circuit 660 for determining (e.g., determining an output or a value), circuit 662 for evaluating (e.g., evaluating an expression), circuit 664 for communicating, circuit 666 for encrypting (e.g., selecting prime numbers, calculating a key, or generating a cyphertext), and circuit 668 for decrypting.

The storage device 630 may store code which, when executed by the processors 610, performs the operations described herein. For example, the storage device 630 may include code 670 for determining (e.g., determining an output or a value), code 672 for evaluating (e.g., evaluating an expression), code 674 for communicating, code 676 for encrypting (e.g., selecting prime numbers, calculating a key, or generating a cyphertext), and code 678 for decrypting.

To enable user interaction, computing system 600 includes an input device 645, which can represent any number of input mechanisms, such as a microphone for speech, a camera for generating images or video, a touch-sensitive screen for gesture or graphical input, keyboard, mouse, motion input, speech, etc. Computing system 600 can also include output device 635, which can be one or more of a number of output mechanisms. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/Re-RAM), phase change memory (PCM), spin transfer torque RAM (STT-RAM), another memory chip or cartridge, and/or a combination thereof.

The storage device 630 can include software services, servers, services, etc., that when the code that defines such software is executed by the processor 610, it causes the system to perform a function. In some aspects, a hardware service that performs a particular function can include the software component stored in a computer-readable medium in connection with the necessary hardware components, such as processor 610, connection 605, output device 635, etc., to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for wireless communication by a first device, comprising: at least one memory; and one or more processors coupled to the at least one memory and configured to: determine, at a security system, a first output associated with a first expression having a first value for a variable of the first expression; determine, at the security system, a second value; evaluate, at the security system, a second expression based on the first output and the second value, the second expression being evaluated to determine a second output associated with the first expression with the variable having a third value, the third value being a product of the first value and the second value; and communicate, via a communication interface coupled to the security system, a message based on the second output.

Aspect 2. The apparatus of claim 1, wherein the first expression comprises: ra+r−a mod n, where a is the variable of the first expression, r is a positive integer, and n is a positive integer.

Aspect 3. The apparatus of claim 1, wherein the second output comprises a cryptography session key for communicating the message.

Aspect 4. The apparatus of claim 1, wherein the one or more processors are further configured to receive, from a second device and via the communication interface, an indication of the first output.

Aspect 5. The apparatus of claim 1, wherein the one or more processors are further configured to: determine, at the security system, a third output value, the third output value being associated with the first expression having the second value for the variable of the first expression; and transmit, via the communication interface, an indication of the third output value to a second device.

Aspect 6. The apparatus of claim 1, wherein the one or more processors are configured to evaluate, at the security system, the second expression in accordance with one or more rules for determining an output of a helper recursive function of the second expression.

Aspect 7. The apparatus of claim 6, wherein the one or more rules include setting the output of the helper recursive function to an identity matrix if the second value is 0.

Aspect 8. The apparatus of claim 6, wherein the one or more rules include setting, if the second value is 1, the output of the helper recursive function to:

$$\begin{pmatrix} g & -1 \\ 1 & 0 \end{pmatrix}$$

where g represents the first output.

Aspect 9. The apparatus of claim 6, wherein the one or more rules include setting, if the second value is even, the output of the helper recursive function to: $M(g, \lfloor k/2 \rfloor)^2$ mod n where M represents the helper recursive function, g represents the first output, k represents the second value, and n is a positive integer.

Aspect 10. The apparatus of claim 6, wherein the one or more rules include setting, if the second value is odd and greater than 1, the output of the helper recursive function to: $m_1 \, m_2$ mod n where n is a positive integer, and where m1 is:

$$\begin{pmatrix} g & -1 \\ 1 & 0 \end{pmatrix}$$

where g represents the first output, and where m2 is: $M(g, \lfloor k/2 \rfloor)^2$ mod n where M represents the helper recursive function, k represents the second value, and n is a positive integer.

Aspect 11. The apparatus of claim 1, wherein the first output is received from a second device, the first output being a cyphertext associated with the message, and wherein the second value comprises a first prime number, the one or more processors being further configured to: evaluate, at the security system, the second expression based on the second output and a second prime number to determine a third output; and decrypt, at the security system, the message based on the third output.

Aspect 12. The apparatus of claim 11, wherein the first prime number and the second prime number are private keys for decrypting the message.

Aspect 13. The apparatus of claim 1, wherein the one or more processors are further configured to: select, at the security system, a subset of prime numbers from a plurality of prime numbers; for each prime number of the plurality of prime numbers, calculate, at the security system, a public key value based on a product of the subset of the prime numbers; and transmit, via the communication interface, each public key calculated for each prime number of the plurality of prime numbers to a second device.

Aspect 14. The apparatus of claim 13, wherein, to calculate a public key value associated with a prime number, the one or more processors are configured to calculate the public key value based on expression: $p_i^{-s}$ mod n where $p_i$ is the prime number, s is the product of the subset of prime numbers, and n is a positive integer.

Aspect 15. An apparatus for wireless communication by a first device, comprising: at least one memory; and one or more processors coupled to the at least one memory and configured to: obtain a message having multiple bits to be encrypted, wherein each of the multiple bits is associated with a public key value of a plurality of public key values; calculate a product of one or more public key values from the plurality of public key values associated with one or more of the multiple bits, the one or more of the multiple bits being logic high; generate a cyphertext based on the product of the one or more public key values; and transmit, via a communication interface, the cyphertext.

Aspect 16. The apparatus of claim 15, wherein the one or more processors are configured to generate the cyphertext based on equation: $V+V^{-1}$ mod n where V is the product of the one or more public key values, and n is a positive integer.

Aspect 17. The apparatus of claim 15, wherein the public key value is received from a receiver device.

Aspect 18. A method for wireless communication by a first device, comprising: determining, at a security system, a first output associated with a first expression having a first value for a variable of the first expression; determining, at the security system, a second value; evaluating, at the security system, a second expression based on the first output and the second value, the second expression being evaluated to determine a second output associated with the first expression with the variable having a third value, the third value being a product of the first value and the second value; and communicating, via a communication interface coupled to the security system, a message based on the second output.

Aspect 19. The method of claim 18, wherein the first expression comprises: ra+r−a mod n, where a is the variable of the first expression, r is a positive integer, and n is a positive integer.

Aspect 20. The method of claim 18, wherein the second output comprises a cryptography session key for communicating the message.

Aspect 21. The method of claim 18, further comprising receiving, from a second device and via the communication interface, an indication of the first output.

Aspect 22. The method of claim 18, further comprising: determining, at the security system, a third output value, the third output value being associated with the first expression having the second value for the variable of the first expres-

19 sion; and transmitting, via the communication interface, an indication of the third output value to a second device.

Aspect 23. The method of claim 18, wherein the second expression is evaluated in accordance with one or more rules for determining an output of a helper recursive function of the second expression.

Aspect 24. The method of claim 23, wherein the one or more rules include setting the output of the helper recursive function to an identity matrix if the second value is 0.

Aspect 25. The method of claim 23, wherein the one or more rules include setting, if the second value is 1, the output of the helper recursive function to:

$$\begin{pmatrix} g & -1 \\ 1 & 0 \end{pmatrix}$$

where g represents the first output.

Aspect 26. The method of claim 23, wherein the one or more rules include setting, if the second value is even, the output of the helper recursive function to: $M(g, \lfloor k/2 \rfloor)^2$ mod n where M represents the helper recursive function, g represents the first output, k represents the second value, and n is a positive integer.

Aspect 27. The method of claim 23, wherein the one or more rules include setting, if the second value is odd and greater than 1, the output of the helper recursive function to: $m_1 \, m_2$ mod n where n is a positive integer, and where m1 is:

$$\begin{pmatrix} g & -1 \\ 1 & 0 \end{pmatrix}$$

where g represents the first output, and where m2 is: $M(g, \lfloor k/2 \rfloor)^2$ mod n where M represents the helper recursive function, k represents the second value, and n is a positive integer.

Aspect 28. The method of claim 18, wherein the first output is received from a second device, the first output being a cyphertext associated with the message, and wherein the second value comprises a first prime number, the method further comprising: evaluating, at the security system, the second expression based on the second output and a second prime number to determine a third output; and decrypting, at the security system, the message based on the third output.

Aspect 29. The method of claim 28, wherein the first prime number and the second prime number are private keys for decrypting the message.

Aspect 30. The method of claim 18, further comprising: selecting, at the security system, a subset of prime numbers from a plurality of prime numbers; for each prime number of the plurality of prime numbers, calculating, at the security system, a public key value based on a product of the subset of the prime numbers; and transmitting, via the communication interface, each public key calculated for each prime number of the plurality of prime numbers to a second device.

Aspect 31. The method of claim 30, wherein calculating a public key value associated with a prime number includes calculating the public key value based on expression: $p_i^{-s}$ mod n where $p_i$ is the prime number, s is the product of the subset of prime numbers, and n is a positive integer.

Aspect 32. A method for wireless communication by a first device, comprising: obtaining a message having multiple bits to be encrypted, wherein each of the multiple bits is associated with a public key value of a plurality of public key values; calculating a product of one or more public key values from the plurality of public key values associated with one or more of the multiple bits, the one or more of the multiple bits being logic high; generating a cyphertext based on the product of the one or more public key values; and transmitting, via a communication interface, the cyphertext.

Aspect 33. The method of claim 32, wherein the cyphertext is generated based on equation: $V+V^{-1}$ mod n where V is the product of the one or more public key values, and n is a positive integer.

Aspect 34. The method of claim 32, wherein the public key value is received from a receiver device.

Aspect 35. A non-transitory computer-readable medium having stored thereon instructions that, when executed by one or more processors, cause the one or more processors to perform operations according to any of aspects 1 to 34.

Aspect 36. An apparatus for wireless communication, the apparatus including one or more means for performing operations according to any of aspects 1 to 35.

What is claimed is:

1. An apparatus for wireless communication by a first device, comprising:
   at least one memory; and
   one or more processors coupled to the at least one memory and configured to:
   determine, at a security system, a first output associated with a first expression having a first value for a variable of the first expression;
   determine, at the security system, a second value;
   determine, at a key exchange component of the security system, a second output, the second output being associated with the first expression having the second value for the variable of the first expression;
   communicate, via a communication interface coupled to the security system, an indication of the second output to a second device;
   evaluate, at the security system, a second expression based on the first output and the second value, the second expression being evaluated to determine a third output associated with the first expression with the variable having a third value, the third value being a product of the first value and the second value; and
   communicate, via the communication interface, a message based on the third output.

2. The apparatus of claim 1, wherein the first expression comprises:

$r^a + r^{-a}$ mod n, where a is the variable of the first expression, r is a positive integer, and n is a positive integer.

3. The apparatus of claim 1, wherein the second output comprises a cryptography session key for communicating the message.

4. The apparatus of claim 1, wherein the one or more processors are further configured to receive, from the second device and via the communication interface, an indication of the first output.

5. The apparatus of claim 1, wherein the one or more processors are configured to evaluate, at the security system, the second expression in accordance with one or more rules for determining an output of a helper recursive function of the second expression.

6. The apparatus of claim 5, wherein the one or more rules include setting the output of the helper recursive function to an identity matrix if the second value is 0.

7. The apparatus of claim 5, wherein the one or more rules include setting, if the second value is 1, the output of the helper recursive function to:

$$\begin{pmatrix} g & -1 \\ 1 & 0 \end{pmatrix}$$

where g represents the first output.

8. The apparatus of claim 5, wherein the one or more rules include setting, if the second value is even, the output of the helper recursive function to:

$$M(g, \lfloor k/2 \rfloor)^2 \bmod n$$

where M represents the helper recursive function, g represents the first output, k represents the second value, and n is a positive integer.

9. The apparatus of claim 5, wherein the one or more rules include setting, if the second value is odd and greater than 1, the output of the helper recursive function to:

$$m_1 \, m_2 \bmod n$$

where n is a positive integer, and where m1 is:

$$\begin{pmatrix} g & -1 \\ 1 & 0 \end{pmatrix}$$

where g represents the first output, and where m2 is:

$$M(g, \lfloor k/2 \rfloor)^2 \bmod n$$

where M represents the helper recursive function, k represents the second value, and n is a positive integer.

10. The apparatus of claim 1, wherein the first output is received from the second device, the first output being a cyphertext associated with the message, and wherein the second value comprises a first prime number, the one or more processors being further configured to:
evaluate, at the security system, the second expression based on the second output and a second prime number to determine a third output; and
decrypt, at the security system, the message based on the third output.

11. The apparatus of claim 10, wherein the first prime number and the second prime number are private keys for decrypting the message.

12. The apparatus of claim 1, wherein the one or more processors are further configured to:
select, at the security system, a subset of prime numbers from a plurality of prime numbers;
for each prime number of the plurality of prime numbers, calculate, at the security system, a public key value based on a product of the subset of the prime numbers; and
transmit, via the communication interface, each public key calculated for each prime number of the plurality of prime numbers to the second device.

13. The apparatus of claim 12, wherein, to calculate a public key value associated with a prime number, the one or more processors are configured to calculate the public key value based on expression:

$$p_i^{-s} \bmod n$$

where $p_i$ is the prime number, s is the product of the subset of prime numbers, and n is a positive integer.

14. A method for wireless communication by a first device, comprising:
determining, at a security system, a first output associated with a first expression having a first value for a variable of the first expression;
determining, at the security system, a second value;
determining, at a key exchange component of the security system, a second output, the second output being associated with the first expression having the second value for the variable of the first expression;
communicating, via a communication interface coupled to the security system, an indication of the second output to a second device;
evaluating, at the security system, a second expression based on the first output and the second value, the second expression being evaluated to determine a third output associated with the first expression with the variable having a third value, the third value being a product of the first value and the second value; and
communicating, via the communication interface, a message based on the third output.

15. The method of claim 14, wherein the first expression comprises:

$$r^a + r^{-a} \bmod n,$$

where a is the variable of the first expression, r is a positive integer, and n is a positive integer.

16. The method of claim 14, wherein the second output comprises a cryptography session key for communicating the message.

17. The method of claim 14, further comprising receiving, from the second device and via the communication interface, an indication of the first output.

18. The method of claim 14, wherein the second expression is evaluated in accordance with one or more rules for determining an output of a helper recursive function of the second expression.

19. The method of claim 18, wherein the one or more rules include setting, if the second value is 1, the output of the helper recursive function to:

$$\begin{pmatrix} g & -1 \\ 1 & 0 \end{pmatrix}$$

where g represents the first output.

20. The method of claim 18, wherein the one or more rules include setting, if the second value is even, the output of the helper recursive function to:

$$M(g, \lfloor k/2 \rfloor)^2 \bmod n$$

where M represents the helper recursive function, g represents the first output, k represents the second value, and n is a positive integer.

21. The method of claim 18, wherein the one or more rules include setting, if the second value is odd and greater than 1, the output of the helper recursive function to:

$$m_1 \, m_2 \bmod n$$

where n is a positive integer, and where m1 is:

$$\begin{pmatrix} g & -1 \\ 1 & 0 \end{pmatrix}$$

where g represents the first output, and where m2 is:

$$M(g, \lfloor k/2 \rfloor)^2 \bmod n$$

where M represents the helper recursive function, k represents the second value, and n is a positive integer.

22. The method of claim 14, wherein the first output is received from the second device, the first output being a cyphertext associated with the message, and wherein the second value comprises a first prime number, the method further comprising:
   evaluating, at the security system, the second expression based on the second output and a second prime number to determine a third output; and
   decrypting, at the security system, the message based on the third output.

23. The method of claim 14, further comprising:
   selecting, at the security system, a subset of prime numbers from a plurality of prime numbers;
   for each prime number of the plurality of prime numbers, calculating, at the security system, a public key value based on a product of the subset of the prime numbers; and
   transmitting, via the communication interface, each public key calculated for each prime number of the plurality of prime numbers to the second device.

24. The method of claim 23, wherein calculating a public key value associated with a prime number includes calculating the public key value based on expression:

$$p_i^{-s} \bmod n$$

where $p_i$ is the prime number, s is the product of the subset of prime numbers, and n is a positive integer.

25. A non-transitory computer-readable medium having stored thereon instructions that, when executed by at least one processor, cause the at least one processor to:
   determine, at a security system, a first output associated with a first expression having a first value for a variable of the first expression;
   determine, at the security system, a second value;
   determine, at a key exchange component of the security system, a second output, the second output being associated with the first expression having the second value for the variable of the first expression;
   communicate, via a communication interface coupled to the security system, an indication of the second output to a second device;
   evaluate, at the security system, a second expression based on the first output and the second value, the second expression being evaluated to determine a third output associated with the first expression with the variable having a third value, the third value being a product of the first value and the second value; and
   communicate, via the communication interface, a message based on the third output.

26. The non-transitory computer-readable medium of claim 25, wherein the second output comprises a cryptography session key for communicating the message.

27. The non-transitory computer-readable medium of claim 25, wherein the instructions, when executed by the at least one processor, cause the at least one processor to receive, from the second device and via the communication interface, an indication of the first output.

28. The non-transitory computer-readable medium of claim 25, wherein the instructions, when executed by the at least one processor, cause the at least one processor to evaluate, at the security system, the second expression in accordance with one or more rules for determining an output of a helper recursive function of the second expression.

29. The non-transitory computer-readable medium of claim 25, wherein the first output is received from the second device, the first output being a cyphertext associated with the message, and wherein the second value comprises a first prime number, and wherein the instructions, when executed by the at least one processor, cause the at least one processor to:
   evaluate, at the security system, the second expression based on the second output and a second prime number to determine a third output; and
   decrypt, at the security system, the message based on the third output.

30. The non-transitory computer-readable medium of claim 29, wherein the first prime number and the second prime number are private keys for decrypting the message.

* * * * *